May 19, 1925.
J. J. KIRWIN
1,538,046
CLUTCH CONTROLLING DEVICE FOR PRESSES AND THE LIKE
Filed Nov. 8, 1923
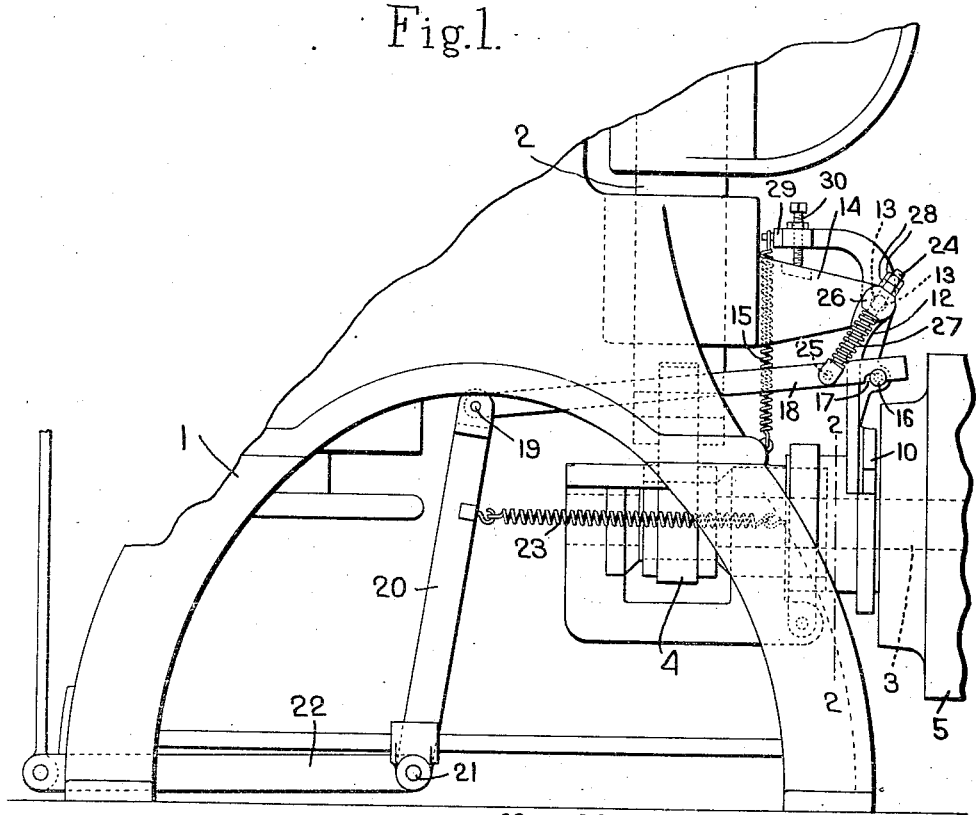
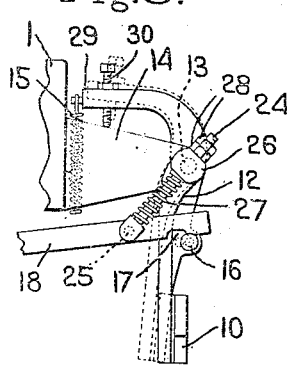
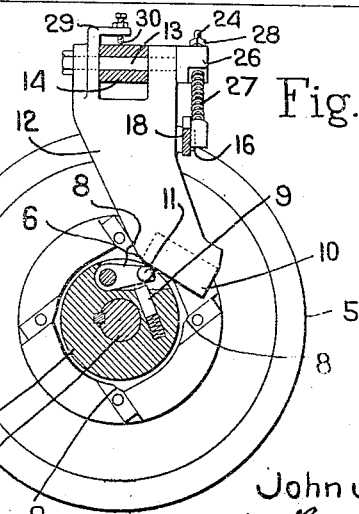
Inventor.
John J. Kirwin
by Heard Smith & Tennant
Attys Patented May 19, 1925.

1,538,046

UNITED STATES PATENT OFFICE.

JOHN J. KIRWIN, OF BOSTON, MASSACHUSETTS, ASSIGNOR TO REECE SHOE MACHINERY COMPANY, OF BOSTON, MASSACHUSETTS, A CORPORATION OF MAINE.

CLUTCH-CONTROLLING DEVICE FOR PRESSES AND THE LIKE.

Application filed November 8, 1923. Serial No. 673,536.

*To all whom it may concern:*

Be it known that I, JOHN J. KIRWIN, a citizen of the United States, and resident of Boston, county of Suffolk, State of Massachusetts, have invented an Improvement in Clutch-Controlling Devices for Presses and the like, of which the following description, in connection with the accompanying drawing, is a specification, like characters on the drawing representing like parts.

This invention relates to a clutch for controlling the operation of presses and like machines. It is a common practise to provide the clutches for actuating punch presses with a treadle arranged so that when the treadle is depressed the clutch will be thrown into engagement and the machine will be operated. Many clutches used for this purpose are so constructed that they will remain operative so long as a treadle is depressed and will automatically become disengaged only when the treadle is raised.

A clutch of this type for operating a press is illustrated in United States Patent No. 1,228,834, June 5th, 1917, and in a later United States Patent No. 1,298,931, March 4th, 1919, is illustrated a clutch device of this nature which is constructed so that the clutch will be automatically thrown out of engagement after the press has made one operation even though the treadle is maintained depressed.

It is the object of my present invention to provide an improved form of clutch-controlling device of the type illustrated in the latter patent and in order to give an understanding of the invention I have illustrated in the drawings a selected embodiment thereof which will now be described after which the novel features will be pointed out in the appended claims.

In the drawings:

Fig. 1 is a fragmentary view showing a portion of a press and my improved clutch-controlling mechanism applied thereto;

Fig. 2 is an enlarged sectional view on substantially the line 2—2, Fig. 1 showing the clutch mechanism;

Fig. 3 is a fragmentary view illustrating the parts embodying my invention.

Inasmuch as the invention relates to the clutch-controlling mechanism I have not thought it necessary to describe a complete press herein but have shown at 1 a portion of the frame of the press, the vertically-moving head of which is connected to a vertically-moving plunger 2 that is given its vertical movement from a driving shaft 3 by means of an eccentric 4 thereon, all as illustrated in the above-mentioned patents. The driving shaft 3 is actuated from a driving pulley 5 and the latter is adapted to be clutched to the shaft 3 by means of a clutch device illustrated in Fig. 2. This comprises a clutch dog 6 which is pivotally arranged in a recess in a collar 7 fast on the shaft 3 and which is adapted to engage any one of a number of shoulders 8 formed on the rotating power pulley 5, the clutch dog being acted on by a spring-pressed plunger 9 which tends to swing it out into the path of the shoulders 8.

The clutch is disengaged by means of a cam shoe 10 co-operating with a projection 11 carried by the clutch dog 6. This shoe 10 is mounted on a swinging elbow lever 12 which is pivoted at 13 to an arm 14 extending from the frame, said lever being acted on by a spring 15 which normally tends to hold the shoe 10 in position to be engaged by the projection 11 on the clutch dog. When the shoe is moved to the left Fig. 1 or into the dotted line position Fig. 3 then it is free from the projection 11 and the clutch will be automatically coupled so that the shaft 3 will be driven from the pulley 5. When the shoe is in the full line position Fig. 1 it stands in the path of travel of the projection 11 so that at a predetermined point in the rotative movement of the shaft 3 the projection 11 will engage the cam face of the shoe 10 and the latter will withdraw the clutch dog from the clutch shoulder 8 thus disengaging the clutch.

The parts thus far described are or may be all as shown in the above-mentioned patents and form no part of the present invention, which relates to a novel connection between the lever 12 and the treadle by which the clutch is controlled and so constructed that the lever 12 will be disconnected from the treadle as soon as the clutch is thrown into operation so that the clutch will be automatically disengaged at the end of one revolution, even though the treadle remains depressed.

The lever 12 is provided with a projection 16 which is adapted to engage in a notch 17 formed in a link connection 18, the latter being pivotally connected at 19 to an arm 20 rigid on a rock shaft 21, the latter having a treadle arm 22 extending forwardly therefrom. The arm 20 is acted on by a spring 23 which tends normally to force it to the right and thereby to hold the treadle 22 raised. When the treadle 22 is depressed the arm 20 is swung to the left Fig. 1 and the resultant movement of the link 18 will operate to swing the lever 12 into the dotted line position Fig. 3 thus withdrawing the shoe from the projection 11 and allowing the clutch to be engaged.

My invention involves a novel construction by which the link 18 is automatically disengaged from the lever 12 as soon as the clutch is engaged so that the shoe 11 will immediately return to the full line position Fig. 1 even though the treadle is held depressed. This is accomplished by means of a radius rod 24 which is pivoted to the link 18 at 25 and which extends through a projection 26. This projection may conveniently be the head of the pivot pin 13 on which the lever 12 is pivotally mounted.

A spring 27 encircles the radius rod and is confined between the forked end thereof that is pivoted to the link 18 and the head 26 and the radius rod is provided with check nuts 28 thereon by which it may be adjusted and retained in adjusted position. The nuts 28 on the radius rod will be so adjusted that when the treadle is raised and the arm 12 is in the position shown in Fig. 1 the notched end of the link 18 will be in a position so that the notch 17 embraces the projection 16 thereby coupling the link 18 to the lever 12. Inasmuch as the pivot of the radius rod is above the link, however, it will be understood that when the link 18 is moved to the left by the depression of the treadle the pivot point 25 of the radius rod will be swung upwardly in the arc of a circle about the shaft 13 as a center and such upward movement will gradually lift the right hand end of the link 18 and thereby disengage it from the projection 16.

The parts are so constructed that this disengagement of the link 18 from the projection 16 will occur just before the treadle is completely depressed but after the lever 12 has been moved to the left far enough to clear the shoe 10 from the clutch dog projection 11.

With this device, therefore, the act of depressing the treadle 22 will throw the clutch into operation and will also disrupt the connection between the treadle and the lever 12 so as to allow the spring 15 to return the shoe to its operative position thereby to ensure that the clutch will be disengaged at the end of one revolution. When the treadle is released the spring 23 will raise it and during the resultant movement of the link 18 to the right the spring 27 will force the notch 17 over the projection 16 again thus automatically coupling the link 18 to the lever 12 ready for the next operation.

The upper end 29 of the arm 12 is bent laterally and carries an adjustable stop screw 30 which co-operates with the arm 11 to limit the swinging movement of the lever 12 in one direction.

While I have illustrated a selected embodiment of my invention I do not wish to be limited to the constructional features shown.

I claim—

1. The combination with an operating shaft, of a clutch by which the shaft is rotated, a spring-actuated swinging arm having a projection and a clutch-disengaging portion, means for moving the arm into inoperative position, said means including a treadle, a link connected thereto and having a notch normally engaging said projection, a rocking member, a radius arm pivotally connected at one end to the link and slidable through the rocking member, and a spring encircling the radius rod and confined between the rocking member and the link, whereby when the treadle is depressed the turning movement of the rocking arm will disengage the link from the projection and when the treadle is released the spring will cause a re-engagement of the link with said projection.

2. The combination with an operating shaft, of a clutch by which the shaft is operated, a spring-actuated swinging arm having a projection, a clutch-disengaging portion, a pivot pin supporting said arm, a treadle, a link actuated thereby and having a notch normally engaging said projection, said pivot pin having a head and a radius arm slidable through said head and pivotally connected to the link, and a nut on said radius rod to limit its movement through the head, whereby when the treadle is depressed the radius arm disengages the link from the projection.

3. The combination with an operating shaft, of a clutch by which the shaft is rotated, a spring-actuated arm pivotally mounted to swing about an axis at right angles to that of the shaft, said arm having a projection and also a clutch-disengaging portion which moves in the direction of the length of the shaft as said arm swings, a treadle, a link actuated thereby, said link extending longitudinally of the shaft and having a notch normally engaging said projection, a radius arm pivoted co-axially with the swinging arm and pivotally connected to said link, whereby during the movement of the link caused by depressing the treadle the radius arm will raise the link to disengage it from said projection thereby allowing the spring-actuated swinging arm to return to normal position and disengage the clutch.

In testimony whereof, I have signed my name to this specification.

JOHN J. KIRWIN.